(12) United States Patent
Chen et al.

(10) Patent No.: US 9,043,344 B1
(45) Date of Patent: May 26, 2015

(54) DATA MINING AND MODEL GENERATION USING AN IN-DATABASE ANALYTIC FLOW GENERATOR

(76) Inventors: Yi-Ling Chen, Austin, TX (US);
Anderson Wong, Sunnyvale, CA (US)

( * ) Notice: Subject to any disclaimer, the term of this patent is extended or adjusted under 35 U.S.C. 154(b) by 0 days.

(21) Appl. No.: 13/357,265

(22) Filed: Jan. 24, 2012

Related U.S. Application Data

(60) Provisional application No. 61/555,407, filed on Nov. 3, 2011, provisional application No. 61/577,474, filed on Dec. 19, 2011.

(51) Int. Cl.
*G06F 17/30* (2006.01)

(52) U.S. Cl.
CPC .............................. *G06F 17/30569* (2013.01)

(58) Field of Classification Search
CPC ................................................. G06F 17/30569
USPC ................................ 707/748, 756; 706/12, 47
See application file for complete search history.

(56) References Cited

U.S. PATENT DOCUMENTS

| | | | |
|---|---|---|---|
| 2004/0215599 A1* | 10/2004 | Apps et al. | 707/2 |
| 2004/0249779 A1* | 12/2004 | Nauck et al. | 706/47 |
| 2005/0102292 A1* | 5/2005 | Tamayo et al. | 707/10 |
| 2008/0154821 A1* | 6/2008 | Poulin | 706/21 |
| 2008/0168011 A1* | 7/2008 | Steinberg | 706/12 |
| 2009/0024551 A1* | 1/2009 | Agrawal et al. | 706/47 |
| 2010/0106743 A1* | 4/2010 | Brunner et al. | 707/780 |

* cited by examiner

*Primary Examiner* — Joshua Bullock
(74) *Attorney, Agent, or Firm* — Dergosits & Noah LLP; Todd A. Noah

(57) ABSTRACT

Embodiments are described for a system and method of providing a data miner that decouples the analytic flow solution components from the data source. An analytic-flow solution then couples with the target data source through a simple set of data source connector, table and transformation objects, to perform the requisite analytic flow function. As a result, the analytic-flow solution needs to be designed only once and can be re-used across multiple target data sources. The analytic flow can be modified and updated at one place and then deployed for use on various different target data sources.

18 Claims, 8 Drawing Sheets

300

| OPERATORS | |
|---|---|
| Aggregate Data | |
| DB Table | DB Table operator allows users to define different source dataset (tables/views) in the database. |
| Table Join | Table Join operator allows users to join the source datasets and select the columns to form a new output dataset for data mining. |
| Prepare Data | |
| Value Analysis | Allows users to quickly summarize the properties of the data columns in the dataset that includes the data type of the data column, the max, min, ave., std dev in the data column, etc. |
| Frequency Analysis | Provides statistics on the distinct values of the each data column in a dataset that includes the no. of instance of each distinct value and their corresponding percentage in the data column. |
| Histogram | Histogram operator allows users to divide numerical data columns into bins and provides visual output of histograms for each column. |
| Aggregate | Aggregate operator allows defining SQL aggregate functions and window functions on the dataset. |
| Row Filter | Row Filter operator allows filtering out any data noise and leave only useful data rows in the dataset. |
| Derived columns | The derived columns feature in the Variable operator allows users to define new derived columns from the existing data. |
| Transform Data | |
| Numeric-To-Text | Numeric-To-Text operator provides a simple way to transform numerical data columns to textual type. |
| Normalization | Normalization include: Proportional transformation, Z-transformation and Range transformation |
| Quantile columns | The quantile columns feature in the Variable operator allows users to define bins to data columns. Assigns each data row to the corresponding bin according to the bin ranges defined by the users. |
| Analyze Data | |
| Correlation | Correlation operator allows users to calculate how two variables are related together. Heavily related variables are eliminated. |
| Naïve Bayes | Naïve Bayes allows users to see how much the dependent variable is affected by each of the other variables in the dataset. Users can then choose the relevant independent columns for model training |
| Build Data Model | |
| Sampling | Provides Random Sampling and Stratified Sampling operators for generating data samples for model training and model evaluation. |
| Association | Association operator provides a power analysis on product recommendation. |
| K-means | Groups the data into clusters, finds the center points of each cluster to provide visualization output |
| Logistic Regression | Ttrains the model for predicting the probability of the occurrence of an event by fitting data to a logit function logistic curve. |
| Linear Regression | Linear Regression operator models the linear relationship between a dependent variable and one or More independent variables. |
| Naïve Bayes | Naïve Bayes operator is a simple probabilistic classifier based on applying Bayes' theorem with strong (naive) independence assumptions. |
| Decision Tree | A decision tree is a classification tree (labels with a range of discrete values), which shows clearly how to reach a decision, and because it is easy to construct automatically from labeled instances. |
| CART | CART builds classification and regression trees for predicting continuous dependent variables (regression) and categorical predictor variables (classification). |
| Neural Network | Implements BP (Back Propagation) neural network. A feed-forward network that adjusts the weight of each unit through errors for the units determined by back-propagating the errors of the units of the output layer. |
| Model | Model operator allows users to store trained model and retrieve saved model for future use. |
| ROC | ROC operator evaluates a model by calculating ROC-AUC value and producing a ROC graph. |
| LIFT | LIFT operator evaluates a model by producing a LIFT graph. |
| Goodness of Fit | Goodness of Fit operator evaluates a model by calculating the precision, recall, F1, sensitivity, specificity and accuracy of each variable. |
| Score Data Model | |
| Prediction | Utilizes the Logistic Regression models, Linear Regression models, Naive Bayes models, Tree models, Neural Network models and applies the model to the dataset perform prediction on each of the data rows in the dataset. Confidence of the prediction will also be calculated. |

FIG. 3

DATA MINING AND MODEL GENERATION USING AN IN-DATABASE ANALYTIC FLOW GENERATOR

CROSS-REFERENCE TO RELATED APPLICATIONS

The present application claims the benefit of the U.S. Provisional Application No. 61/555,407 entitled "Methods and Systems for Data Mining," filed on Nov. 3, 2011, and U.S. Provisional Application No. 61/577,474 entitled "Database Mining and Model Exchange," filed on Dec. 19, 2011

FIELD OF THE INVENTION

One or more implementations relate generally to data management, and more specifically to implementing a data miner that generates and runs analytic flows on data where the data resides.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Business organizations typically generate, store, and analyze huge amounts of data as part of their normal business activities. Organizations that process large amounts of data typically rely on large storage resources and integrate their various databases into data warehouses through data warehousing techniques that centralize data management and retrieval tasks to maintain a central repository of all organizational data. Although such centralization of data is helpful in maximizing data access and analysis, in many organizations data resides in different locations and may be managed by different database engines. This situation is relatively common, since many enterprises actually decentralize many of their departmental operations. The creation of disparate data sources and database management systems also occurs due to merger/acquisition activities of companies with dissimilar IT (information technology) systems and databases.

The process of data mining involves analyzing data from different perspectives and summarizing it into useful information that can be used to improve performance, such as by increasing revenue and/or cutting costs. As a functional process, data mining involves of finding correlations or patterns among dozens of fields in large relational databases. These patterns themselves comprise useful information about the data, and various different data mining programs have been developed to allow users to analyze and categorize data, and summarize the relationships among the data elements.

Present data mining systems are usually proprietary and tied to specific databases. As such, analytic flows and the models generated by these flows are tightly coupled to a particular source database. In an industry or organization where different data sources and database engines are used, this tight coupling results in models that are not portable or reusable. For example in many retail industries, such as telecom or finance, churn models are useful in forecasting customer turnover and retention. Using present data miners that are specific to a particular database results in generating churn models that are applicable only to a particular business or data set. This limits the utility of the model since it is not shareable among different enterprises.

What is needed, therefore, is a data mining process that is data source-agnostic by being less data-dependent and more process oriented in order to produce analytic flow models that can be shared between organizations using different data sources and database engines.

Present data mining systems also require data to be moved out of the database environment and native data source and moved to another location in order for analytic flow operations to be performed on the data. The resulting model data is often then saved in a separate data repository using a proprietary format. This further restricts portability and also adds a great deal of processing overhead and latency in performing data mining operations. This also prevents the analytic flow operations to be executed on the entire data set if a large amount of data is involved, since the wholesale movement of data can be expensive in terms of memory and processor requirements. Such movement of data also introduces potential data security risks, as data fetch and store cycles are greatly increased during data mining operations.

What is further needed, therefore, is a data miner architecture that reduces unnecessary data movement and latency, and supports optimal data governance and data mining process standardization, to achieve fast and efficient analytic data processing.

What is yet further needed is a data miner that performs analytic flow within the database so as to leverage a database's common security, auditing and administration capabilities, in order to reduce data movement and increase data utilization, and that performs the analytic flow operations across all of the data in a data set.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 3 is a table 300 that illustrates example operators for use with a data miner, under an embodiment.

DETAILED DESCRIPTION

Figure 1:
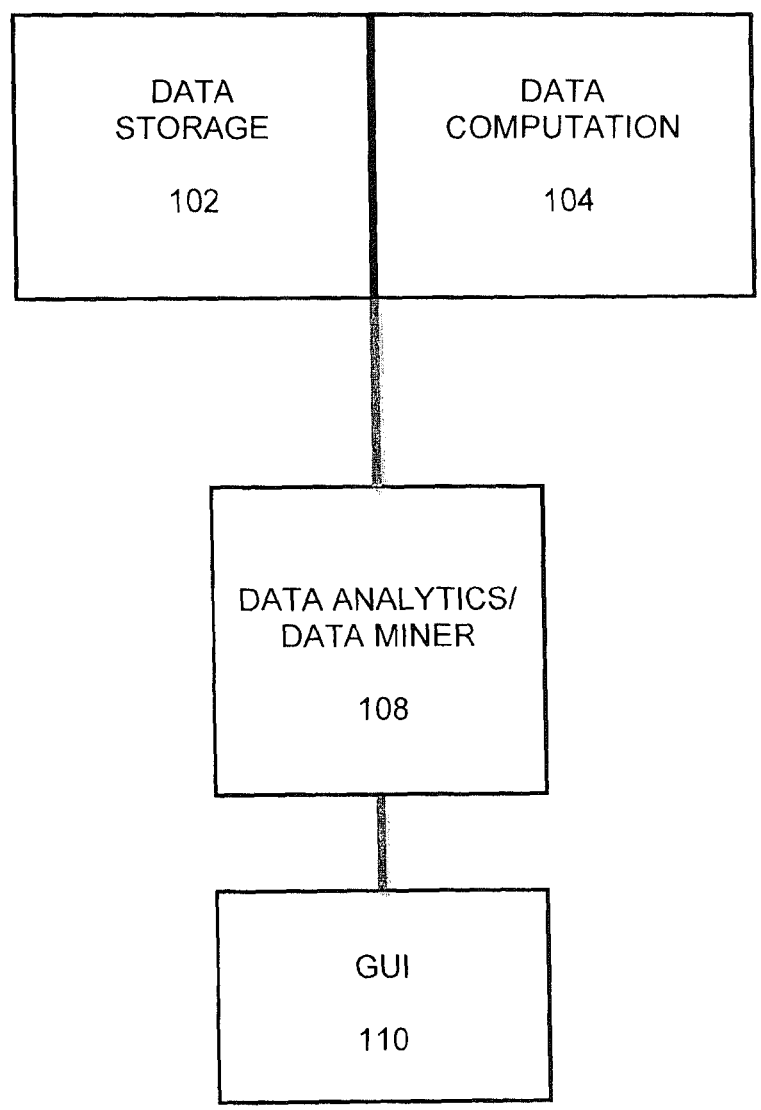
FIG. 1 is an overall system diagram of a data miner used in conjunction with data storage and database systems, under an embodiment.

Systems and methods are described for a data mining system and analytic model sharing application, and associated graphical user interface are described. Aspects of the one or more embodiments described herein may be implemented on one or more computers executing software instructions. The computers may be networked in a client-server arrangement or similar distributed computer network, and one or more of the networked computers may host web pages that are accessed by one or more client computers through web browser programs.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Embodiments are directed to a visual, objected-oriented data mining tool built on and integrated seamlessly with a database to utilize a massively parallel processing (MPP) architecture for scalability and performance. The data miner provides a fully integrated environment to provide statistical transformation and modeling methods for data analysis, modeling and scoring. The data miner implementation described herein circumvents the current industry practice of tightly coupling in-database analytic flows program to the source database used for designing the analytic flow. This enables the in-database analytic flow and its program to be agnostic to the data sources. In this manner, any new data source can use an existing in-database-analytic-flow by externally mapping its source attributes to the existing in-database-analytic-flow component. Thus, existing in-database-analytic-flows are highly portable and can be used with various databases.

As used herein, "data" refers to any facts, numbers, or text that can be processed by a computer. Data may include operational or transactional data (e.g., sales, cost, inventory, payroll, and accounting), nonoperational data (e.g., industry sales, forecast data, and macro economic data), and metadata, which is data about the data itself (e.g., attributes datatypes, and definitions). The terms "component," "process," and "module" are used interchangeably to refer to a logical component that is configured to perform certain functionality as described herein, and which may be implemented at least partially as an electronic hardware component, and therefore constitutes a machine, or may be implemented in software, hardware, or a combination of software and hardware for execution or implementation in a processor-based computing system.

FIG. 1 is an overall system diagram of a data miner used in conjunction with data storage and database systems, under an embodiment. The data miner 108 essentially combines functions of data storage 102 and data computation data engine 104. The data storage function 102 may represent storage of data in one or more physical memory components, such as optical or magnetic disk storage, tape storage, RAID arrays, flash memory, or other similar memory storage media. The data computation function 104 performs database management functions on data stored by one or more database platforms, such as Oracle™, Greenplum™, PostgreSQL, or other databases. In an embodiment, the overall system of FIG. 1 represents an enterprise data cloud solution environment for large-scale data warehousing and analytics using enterprise storage arrays, storage area networks and archive resources for use by content management systems.

The data miner 108 can be used by business analysts and data analysts to flexibly and efficiently conduct end-to-end knowledge discovery and predictive analytics processes starting from data preparation, data transformation, to data modeling and data scoring against all data in a database and at the location where the data resides, regardless of the number of available independent variables or the complexity of the data types inside the database. The data models built with data miner are automatically stored in the database and are re-playable (model codes, inputs, outputs, associated property file, user defined data transformations, and so on). The stored models can also be published or deployed directly within the database, further assuring data reliability and integrity and accelerating the model integration with business applications. The data miner 108 also includes a graphical user interface (GUI) function 110 that provides a graphical tool to display data analysis tools and operations to the user.

Figure 2:
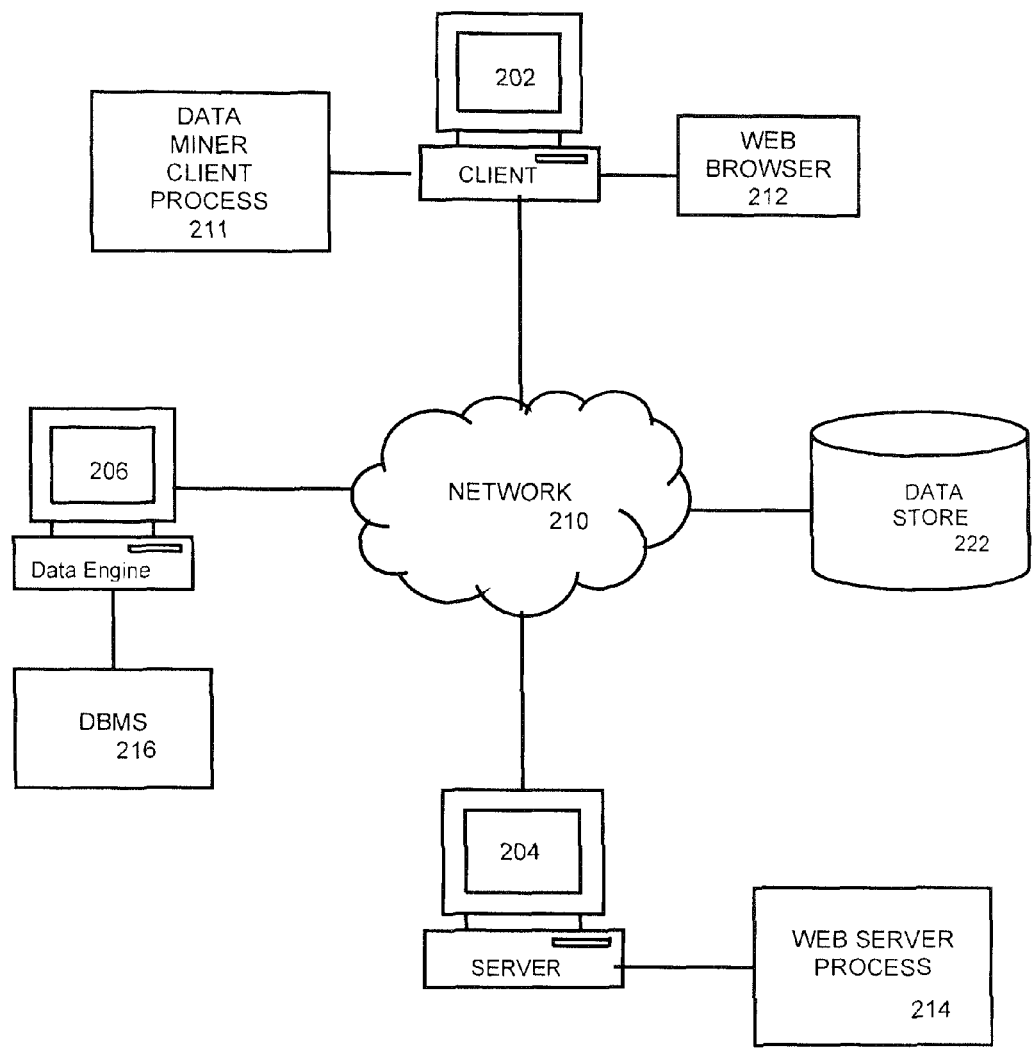
FIG. 2 illustrates a computer network system 100 that implements a data organization process, under an embodiment.

As stated above, the data miner function 108 may be implemented within an enterprise-scale, cloud-based computing environment. In general, the data miner 108 is implemented in a network computer system, and represents a process that is executed on a server computer coupled to one or more client computers over a network. FIG. 2 illustrates a computer network system 200 that implements a data miner process, under an embodiment. In system 200, an organization computer 202 is coupled to network 210 through appropriate network interface components (not shown). The customer computer 202 is typically a workstation or personal computer class device, but may also be embodied as a client processing device, such as a laptop computer, netbook, smart phone, tablet computer, personal digital assistant (PDA) or similar mobile communication device. A server computer 204 is also coupled to the network 210 and is configured to provide components to the client 202 through a network interface. For example, the server 204 may be a web-server that executes a web server process 214. The server computer 204 may be implemented within any suitable networkable computing device, such as server-class computers, workstations, personal computers, or any similar device capable of hosting applications accessed over network 210. Network 210 may be the Internet, a Wide Area Network (WAN), a Local Area Network (LAN), or any combination thereof. For embodiments in which network 210 is the Internet, the networked computers may the other computers and other resources through appropriate web interface components 212 (e.g., web browser and web server processes). In a typical implementation, one or more of the server computers in system 200 may be World-Wide Web (WWW) servers that store data in the form of web pages and transmit these pages as Hypertext Markup Language (HTML) files over the Internet 210 to client devices and other networked computers 202.

In an embodiment of network 200, the data mining process is implemented as a thick-client process 211 executed locally on client 202 to design build predictive models, as well as other data mining functions. This client process connects to a relational database management system (DBMS) process 216 run on a data engine platform 206. The DBMS processes data stored in one or more data stores 222. The data miner process allows the user to build models that run on the data set in the DBMS environment 216. This allows the analytic models to be run directly on the data in the environment in which the data resides. The data miner process 211 includes two sub-processes, one that moves data around in the database for generating the model, and the second executes the model on the data in the data set. Any movement of data using data miner process 211 occurs within the data store 222, and does not involve movement of data in and out of the data store for purposes of generating and running the analytic model.

In an alternate embodiment, one or more functions of the data miner process 211 may be implemented as one or more server-side processes executed on server 204, or any other supplemental server coupled to network 210. In such an alternative embodiment, the models generated by individual users can be packaged as web-executable components for sharing and execution in cloud-based environments. This is a web-enabled (services enabled platform) that facilitates a model share publish and subscribe system. Such as system utilizes XML techniques to allow exportability of models and charts that are built by certain users. This will help establish an "Analytics-as-a-Service" platform. Models built by third party designers can then be downloaded, modified (to the extent allowed), and executed by users to effectively provide a model-sharing platform.

Model Generation

The data miner 108 functions by applying algorithms on the data. Operators are used to apply data mining algorithms, and are the basic units of the data mining analytic flow. Any number of operators may be used. FIG. 3 is a table 300 that illustrates example operators for use with a data miner, under an embodiment. The operators are grouped into various data processing categories including: aggregation, preparation, transformation, analysis, model building, and model scoring. Each operator within a category performs a certain function or task with respect to the data. Typical functions associated with each of the operators are provided in the second column of table 300. It should be noted that the example categories, operators and their respective functions are provided primarily for purposes of illustration, and that many other or different categories, operators, and functions are possible. For example, operators can also be provided for publishing data models (e.g., through flow export and batch execution operators, etc.) and generating analytics reports (e.g., through report export operators).

Figure 4:
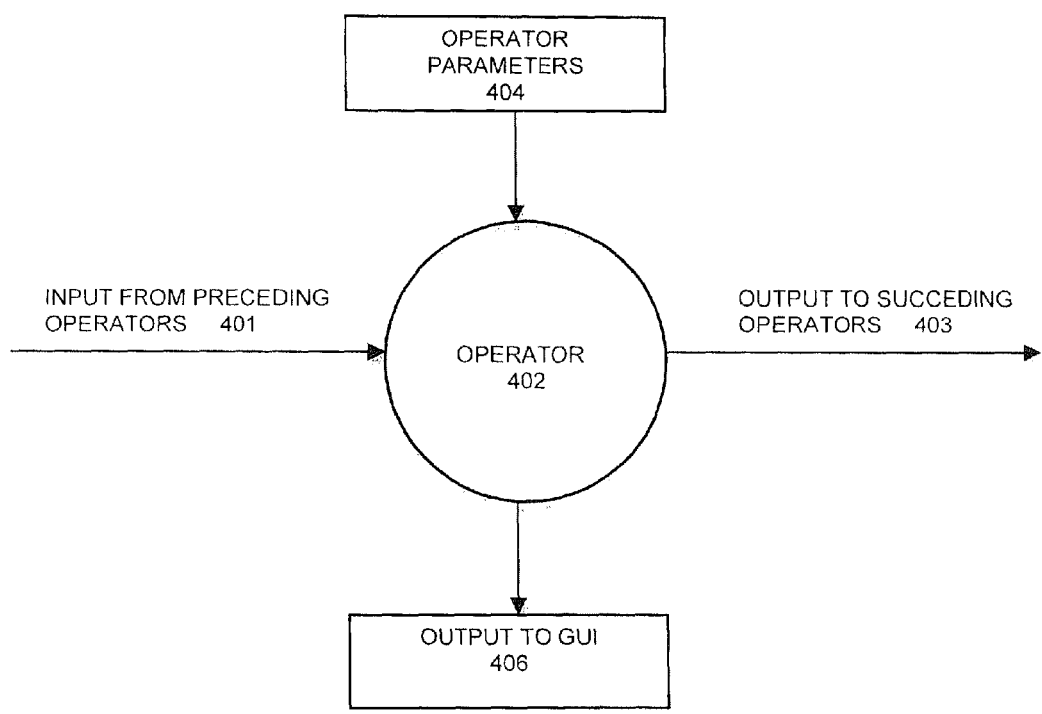
FIG. 4 is a flow diagram that illustrates the use of operators to implement a data mining process, under an embodiment.

To create a data mining process using the data miner, users are actually creating a flow of operators. Each operator takes input from one or more preceding operators, performs its task and produces output through succeeding operators. FIG. 4 is a flow diagram that illustrates the use of operators to implement a data mining process, under an embodiment. Operators 402 may have parameters 404 that can be configured by the user and may produce its visual output 406 through the GUI process 110. Validation is implemented in the connections created between operators. Input 401 from a preceding operator is received by the operator 402 and the output information 403 produced by the operator is then passed to its succeeding operator after applying the applicable parameters 404 and functions of the operator 402. This forms an information flow through operators during the flow execution.

The data miner may include an analytical flow engine that checks if the required inputs can be obtained from any preceding operators. It will also determine the path of the operator flow, and the dependence between operators. The analytic flow engine can also be configured to check if all required parameters are present, and block the flow from starting, if not. Upon completion of a task, the analytic flow engine will obtain the operator output and display it through the GUI.

In designing analytic flows to address business problems or issues, data is collected by the relevant department, such as the sales department for revenue issues, the IT (information technology) department for communication and data processing issues, and so on. The process of data modeling is generally used to define and analyze the data requirements needed to support the relevant business processes within the scope of corresponding information systems in the organization. This process may involve data modelers (users) working with various entities and databases in the organization. The task of data modeling generally involves the following tasks: first, the modeler explores the data residing in the database produced by either data captured by normal business transactions or CRM (customer relationship management) systems, or the like; second, the modeler transforms the data into a meaningful form for modeling; third, the modeler trains and generates predictive models, and fourth, the modeler applies the generated model on target data source in order to optimize business operational environment. As a preliminary step, the organization may need to perform a validation exercise to verify that the modeler is able to perform these tasks, which may be assumed at the outset.

A typical implementation of the data miner process 108 is to generate a predictive model that is run on data (e.g., customer data) to predict buying patterns or other relevant behavior. In such an embodiment, the data miner supports certain predictive data mining algorithms including: logistic regression, linear regression, Naïve Bayes, CART tree, decision tree, neural network, SVM, time series, and Adaboost. These algorithms use the data in the input database table to produce a model (model training). Model training usually iterates a number of times before a satisfactory model can be found. The agnostic nature of the data mining process with respect to the database, allows the generated models to be readily exported and exchanged for use with different databases.

Figure 5:
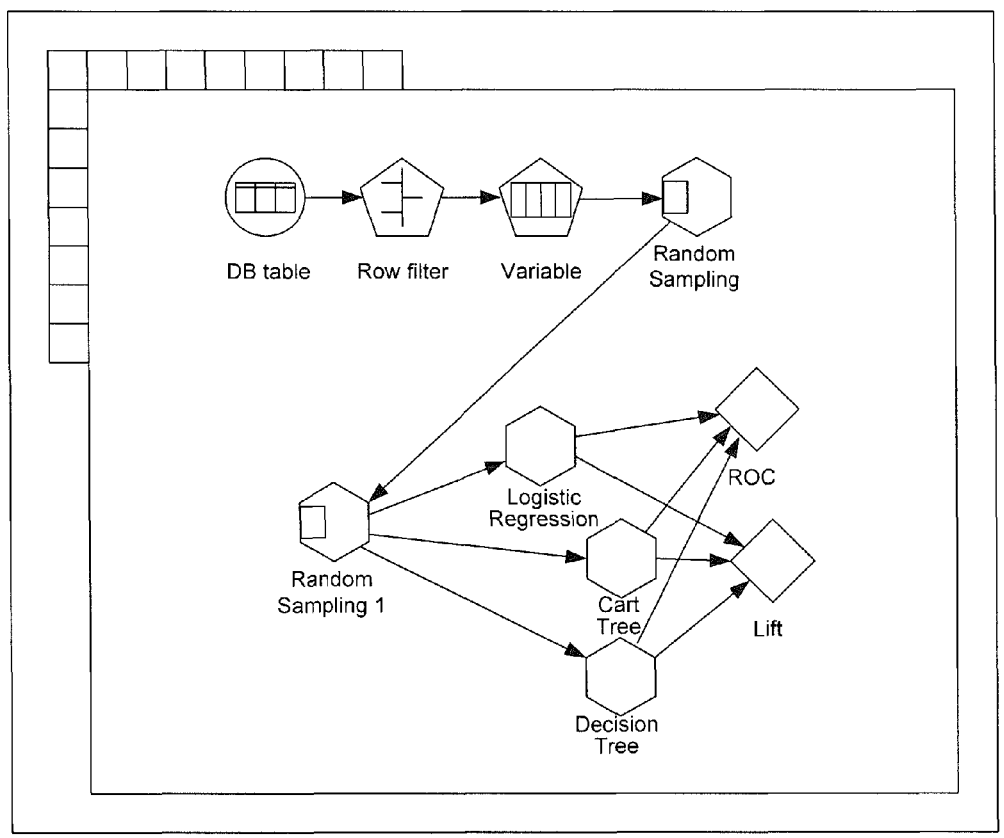
FIG. 5 illustrates an example of an analytic flow design displayed through a GUI, under an embodiment.
Figure 8:
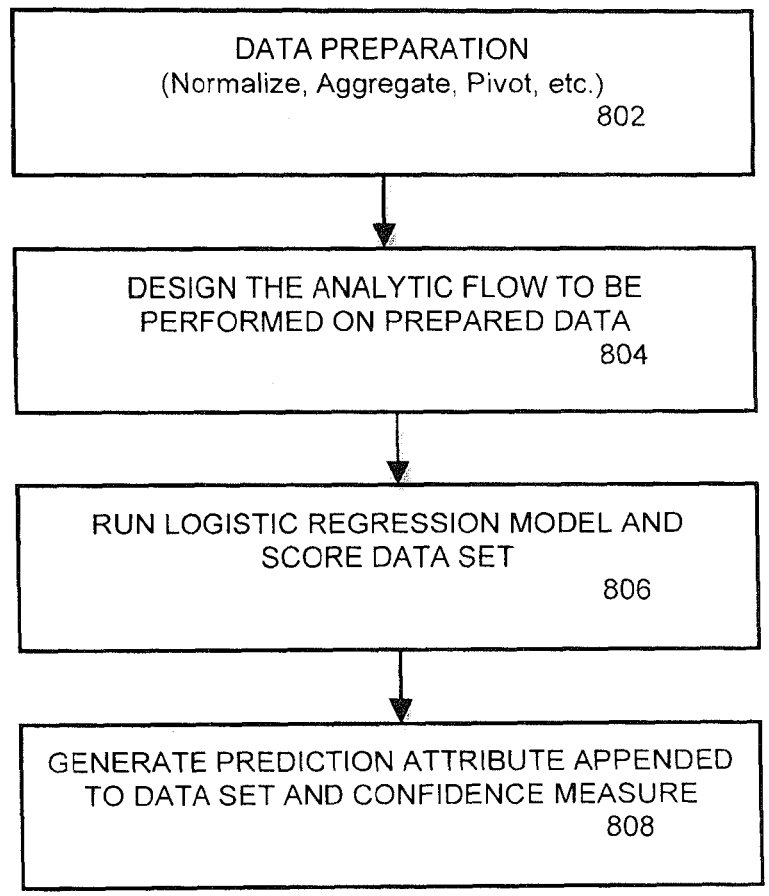
FIG. 8 is a flowchart that illustrates the steps of generating an analytic flow model for predictive modeling using an in-database data miner, under an embodiment.

FIG. 5 illustrates an example of an analytic flow design displayed through a GUI, under an embodiment. The analytic flow 500 shows the interconnection between various operators represented as icons in the display. In general, an analytic flow may be a fairly complex problem with equally complex interweaving of components as a solution. The repeated implementation of this complex solution for each data source, which is typically a slow and costly process, is optimized using data miner 108. The example of FIG. 8 illustrates random sampling operations performed using different operators for different predictive algorithms (logistic regression, CART tree, decision tree, Bayes, etc.).

In order to make the generated model pervasively applicable to the whole organization, it will need to share and manage the analytic flow generated during the modeling phase and apply the model to different set of data. For example, a multi-national enterprise may have a database residing in different locations or branches. It is important for the enterprise to then make the developed model applicable to all branches, instead of applicable to only one branch, in order to optimize data use (such as to minimize IT expenses).

Analytic Flow Design

In an embodiment, the data miner 108 decouples the analytic flow solution components from the data source. The analytic-flow solution is then coupled with the target data source through a simple set of data source connector, table and transformation objects, to perform the requisite analytic flow function. As a result, the analytic-flow solution needs to be designed only once and can be re-used across multiple target data sources. It can be modified and updated at one place and then deployed for use on all target data sources.

The disclosed method handles the decoupling of the data source and analytic flow through a named data source connector (DS Connector) object and a table object that is assisted by a transformation object. The DS Connector object is unique to each data source. The table object serves as the only conduit between the physical data-source environment and the analytic-flow world.

The analytic flow is designed using a template data source. The transformation object maps the target data source attributes to template data attributes from which the analytic-flow is designed. The table object isolates the analytic-flow from needing to know the details of what and how of the target data source. The transformation object eliminates the analytic-flow the need to be aware of the difference between the template data source, from which it was designed, and the target data source (that is currently intended to be operated on). Each of these objects has certain attributes as described below.

The DS connection object is identified by a name and includes a pointer to the real physical data source, which could be either relational database or files which could be either regular files or distributed files (e.g., Hadoop files). The DS connection object stores all of the metadata information of the physical data source.

The table object stores the data set information, and has the following attributes: connection name that points to a specific connection, attributes types, attributes name, and a mapping. The transformation object has the following attributes: template data attributes, source data attributes, and a mapping relationship between target source-data and template source-data attributes.

Figure 6:
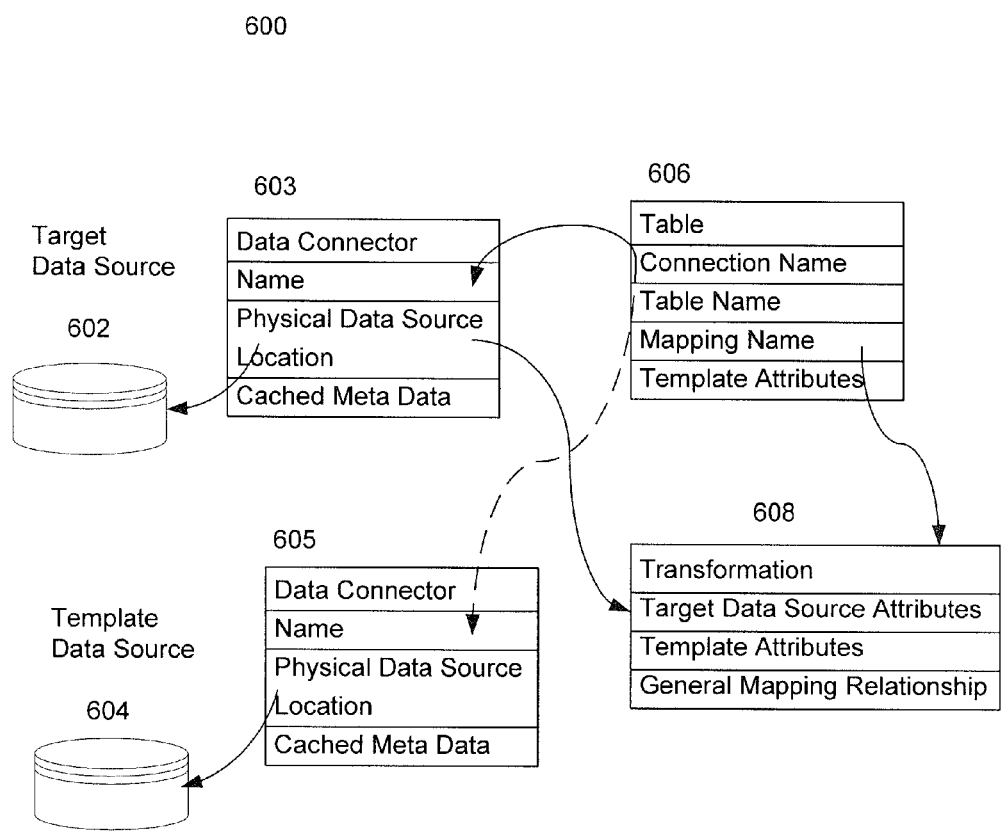
FIG. 6 is a diagram illustrating the relationship between the data source connection object, table object and transformation object, under an embodiment.

FIG. 6 is a diagram illustrating the relationship between the data source connection object, table object and transformation object, under an embodiment. As shown in diagram 600 of FIG. 6, data is stored in a physical target data source 602. Such data can be data objects, files or other elements that may be managed by a database management system. A data source connector (data source connection object) 603 is defined that is unique to the data source, and includes attributes that comprise a name of the data source connection object, a pointer to the physical data source, and a storage for metadata of the physical data source. A table object 606 references the data source connection object and interfaces between the physical data source and the analytic flow. The table object 606 stores a connection name that points to a specific connection between the data connection object and the physical data source, one or more attribute names and attribute types for the data source connection object, and a mapping between the physical data source and a template data source 604. The table object 606 also references a data connector 605 that references the template data source 604.

A transformation object 608 maps attributes of the target data source to template data attributes from which the analytic flow is designed. The transformation object 608 stores one or more attributes for the template data source and one or more attributes for the physical data source, and a mapping relationship between data in the target data source and corresponding data in the template data source.

In an embodiment, an analytic flow object stores the node sequences and individual node information. Such nodes include the operator icons illustrated in FIG. 5. The analytic flow contains a set of core characteristics. The first characteristic of the analytic flow are the nodes of the flow, which are represented by individual icons in FIG. 5. Each node comprises a set of tables (table objects) where the data resides followed by all the transformation and algorithmic operators for predictive analytic operations. The next characteristic is the sequences of executions for all the nodes designed in the flow. This is represented by the linkages among the nodes, which are executed left-to-right through the nodes. The process automatically repopulates the attributes inside nodes after a table's metadata has been refreshed and cached based on new data source.

In an embodiment, the decoupled data miner process achieves reuse of the analytic flow against different data source and makes the de-coupling of analytic flow and data possible for the system.

Graphical User Interface

Figure 7:
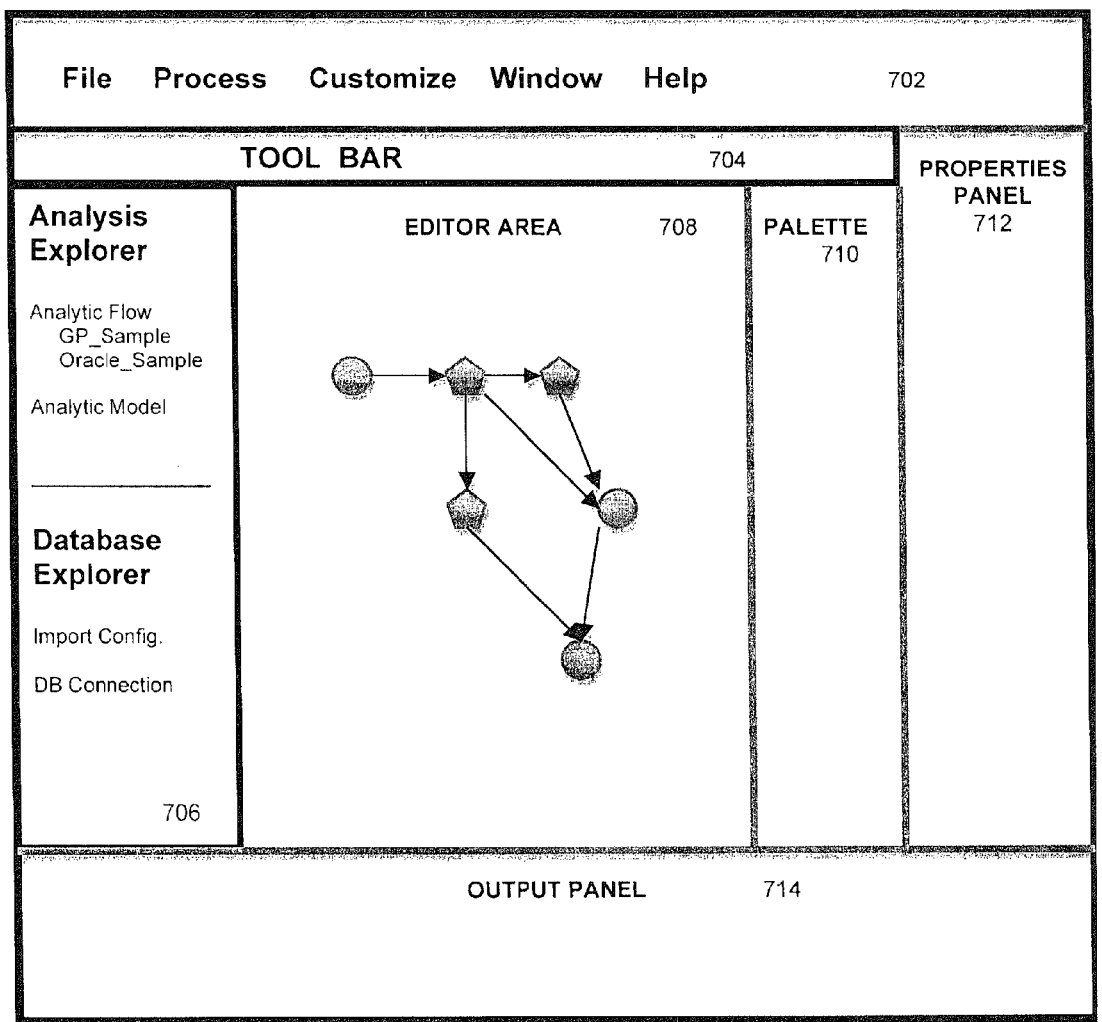
FIG. 7 is an example screenshot of a graphical user interface for a data miner, under an embodiment.

As shown in FIG. 1, the data miner includes or is coupled to a GUI process to accommodate input/output interface to users. In an embodiment, the GUI includes a number of display areas that are shown on the display screen of the client computer 202. FIG. 7 is an example screenshot of a graphical user interface for a data miner, under an embodiment. The display areas comprise a graphical unit that may be referred to as a "workbench." The workbench can include various GUI elements, such as a menu bar, tool bar, analysis explorer, editor area, properties panel, output panel, and operator palette (shown when editing an analytic flow), among others.

The menu bar 702 includes access to several interface elements that allow the user to manipulate files and analytic flows created and managed within the system. The toolbar 704 contains access to functions that allow the user to create, save, and modify analytic flows by selecting and linking operators. The analysis and database explorer panel 706 lists user resources such as analytic flows and analytic models. An analytic flow is a set of connected operators for performing the data mining process and an analytic model is the product of a model training operator (e.g., a logistic regression operator). The database explorer includes database connections that defines the access to a database resource. The editor area 708 is a main display area that allows the user to create and modify different user resources. An analytic flow editor allows the user to drag and drop icons representing operators onto the analytic flow editor and establish connections between them to form a data mining analytic flow. An operator palette 710 is a display area from which the user can select the operators. The properties panel 712 is a display region where the user can configure an operator's parameters. The output panel 714 provides visual output during the creation and running of an analytic flow.

The GUI process 110 facilitates the creation of a data mining analytic flow. Creating an analytic flow comprises the steps of: creating and maintaining database connections, adding operators to the analytic flow editor, adding a data source, connecting the operators, and configuring the operator parameters. In order to access the data stored in database tables, a database connection session is established. This requires connection parameters to be supplied to the database, and such information can be saved in the form of a database connection. The database connection specifies a connection name and the selected database engine (e.g., Greenplum/Postgres, Oracle, etc.). After the database connection is set up, an analytic flow can be created. Within the palette 710 operators are represented as unique icons, based on shape, pattern, color, or any combination thereof. Standard GUI drag and drop editing tools are provided to allow the user to quickly and easily create flows by placing and connecting the operator icons in the editor area 708, as shown in FIG. 7. Once an analytic flow is built using data miner client process 211, it is pushed into the database environment 216 and the analytic flow is then performed directly on the data in the data store 222. This effectively creates an in-database analytic flow that operates directly on the data where the data resides and through the native DBMS platform.

Each of the operator icons has a one-to-one connectivity to a database computation that is executed on the data in the data set. The computation is then executed as the analytic flow is executed within the DBMS environment itself. Thus, no movement of data in and out of the data store 222 is required.

Any data movement required for operation of the analytic flow occurs within the data store. A run operation automatically runs on all of the relevant data within the data store managed by the database engine. As the analytic flow is executed, data is pulled from the data store and processed through the computation steps represented by the icons from left-to-right across the editor area 708.

The data miner requires a data source, and in an embodiment, the GUI process provides a special operator (DB table) for denoting a data source. A DB table represents either a database table or a view. A table or view is defined by the following properties: database connection, schema, and table name (or view name). These properties are the parameters for configuring a DB table operator.

Once an analytic flow is created, it can be run. The GUI 110 includes mechanisms to run the analytic flow, read the output of the analytic flow, and save the output of the analytic flow to a file. The GUI includes certain validation checks to ensure that all operators are ready (e.g., essential parameters are provided in proper format and value ranges), and that the operators can receive the required input from preceding operators, if necessary. A log message display of the output panel 714 can display messages during the execution of an analytic flow. The visual output displayed in the output panel 714 depends on the output generated by the operators. Most operators produce some form of visual output, such as a decision tree from a decision tree operator.

A major use case of the data miner 108 is to generate predictive models for use with enterprise data. FIG. 8 is a flowchart that illustrates the steps of generating an analytic flow model for predictive modeling using an in-database data miner, under an embodiment. As shown in process 900, an initial step involves preparing the data through functions such as, normalizing data, joining data, aggregating data, changing datatypes, pivoting data within the database, and so on. Individual operators are provided for each of these computational algorithms. The prepared data resides in the data store. Using the GUI environment described above, the user then designs the analytic flow that defines computational processes to be executed on the prepared data, block 804. This combines the data with the database tables to create an enriched data set or "super" table of data.

In the case of a predictive modeling application, the execution of the analytic flow involves running a logistic regression algorithm (or any other similar algorithm) on the data and then scoring the data, block 806. This is usually an iterative process to determine the level of accuracy provided by the model. Certain operators may be provided to optimize this process, such as sampling operators to work on subsets of data. Since the analytic flow is pushed to the data in the data store and executes on the data in the data store, this process allows for scoring of entire data sets. The data miner includes a scoring operator that generates a scored data set that resides in the data store. The scoring step provides an indication of the presence and degree of any errors in the resulting scored data set. The operator generates an attribute extended on the data set provides a prediction regarding the target (i.e., a customer or user) that the data relates to, and also a confidence measure that provides the degree of confidence in the prediction generated by the model, block 808. The resulting scored data set can then be exported through other GUI functions for output to the user.

The data miner thus allows the user to define an analytic flow process to build a model and pushes the analytic flow to the DBMS environment for execution of the analytic computations on the data where the data resides. This provides a significant advantage over present systems in which the data is moved out of the database environment and the resulting model is stored in a proprietary format separate from the data itself.

The data miner system also provides an environment in which developers can develop and share or exchange models. In an embodiment, system 200 of FIG. 2 may include a supplemental server that operates as a model exchange or sharing platform. Developers can upload their models to this server for access by others. Any known subscription or exchange models can be used to facilitate the sharing of these models.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

The illustrated and described method elements are not necessarily strictly independent or unitary method steps. One or more of the illustrated elements (steps) may be combined with one or more of the other elements. Likewise, one or more of the illustrated method elements may be separated into one or more constituent sub-elements or sub-steps. These steps and sub-steps may be performed by the same or different hardware components and software processes, such as those shown in FIG. 2. At least one component defined by the claims may be implemented at least partially as an electronic hardware component, such as an instruction execution machine (e.g., a processor-based or processor-containing machine) and/or as specialized circuits or circuitry (e.g., discrete logic gates interconnected to perform a specialized function). Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of defining an analytic flow within a database to be executed on data stored in a physical target data source and managed by a database management system, comprising:
   defining a data source connection object that is unique to the physical target data source as compared to a plurality of other data sources, the data source connection object being a data structure comprising a pointer to the physical target data source;
   defining a table object that references the data source connection object and interfaces between the physical target data source and the analytic flow within the database, wherein the analytic flow within the database is created using a template data source, wherein the template data source is different from the physical target data source, and the table object stores a mapping between the physical target data source and the template data source, the table object further storing attributes of the physical target data source and a connection name that points to a specific connection between the data source connection object and the physical target data source;
   defining a transformation object that maps the attributes of the physical target data source to template data attributes that are stored in the template data source, wherein the transformation object is defined to exist separate from the table object; and
   receiving the analytic flow by the database management system, the analytic flow operating within the database management system on data stored in the physical target data source that has been retrieved using the table object and transformed using the transformation object.

2. The method of claim 1 wherein the physical target data source comprises one of a relational database, and one or more data files.

3. The method of claim 2 wherein the data source connection object comprises a name of the data source connection object and a storage for metadata of the physical target data source.

4. The method of claim 3 wherein the table object further stores one or more attribute names and attribute types for the data source connection object.

5. The method of claim 4 wherein the transformation object stores one or more attributes for the template data source and one or more attributes for the physical target data source, and a mapping relationship between data in the physical target data source and corresponding data in the template data source.

6. The method of claim 1 further comprising, providing a graphical user interface for designing and defining the analytic flow, the graphical user interface providing icons representing nodes in the analytic flow, wherein each node encapsulates a pointer to a physical location in which the data is stored in the data store, and an operator for transformation or algorithmic processing of the data.

7. The method of claim 6 wherein the graphical user interface further comprises output processes to display messages associated with the execution of each node as the analytic flow is performed on the data.

8. The method of claim 1 wherein the analytic flow defines a predictive model comprising predictive algorithms selected from the group consisting of: logistic regression, CART tree, decision tree, Naïve Bayes, and Neural network algorithms.

9. A system for defining an analytic flow within a database to define a predictive model, comprising:
   a database managing component managing data for an organization;
   a physical target data source storing the data;
   a data source connector object that is unique to the physical target data source as compared to a plurality of other data sources, the data source connection object being a data structure comprising a pointer to the physical target data source;
   a table object that references the data source connector object and interfaces between the physical target data source and the analytic flow within the database, wherein the analytic flow is created using a template data source, wherein the template data source is different from the physical target data source, and the table object is defined to store a mapping between the physical target data source and the template data source, the table object further storing attributes of the physical target data source and a connection name that points to a specific connection between the data source connection object and the physical target data source;
   a template data source storing attributes for the analytic flow within the database; and
   a transformation object that maps the attributes of the physical target data source to the template data attributes that are stored in the template data source, wherein the transformation object is defined to exist separate from the table object, wherein the analytic flow is received by the database managing component, the analytic flow operating within the database management system on data stored in the physical target data source that has been retrieved using the table object and transformed using the transformation object.

10. The system of claim 9 wherein the data source connection object comprise a name of the data source connection object and a storage for metadata of the physical target data source.

11. The system of claim 10 wherein the table object further stores one or more attribute names and attribute types for the data source connection object.

12. The system of claim 11 wherein the transformation object stores one or more attributes for the template data source and one or more attributes for the physical target data source, and a mapping relationship between data in the physical target data source and corresponding data in the template data source.

13. A computer program product, comprising a non-transitory machine-readable medium storing instructions, which when executed by a processor, cause a computer to perform a method for defining an analytic flow within a database to be executed on data stored in a physical target data source and managed by a database management system, the method comprising:
   defining a data source connection object that is unique to the physical target data source as compared to a plurality of other data sources, the data source connection object being a data structure comprising a pointer to the physical target data source;
   defining a table object that references the data source connection object and interfaces between the physical target data source and the analytic flow within the database, the table object storing attributes of the physical target data source and a connection name that points to a specific connection between the data source connection object and the physical target data source;
   defining a transformation object that maps the attributes of the physical target data source to template data attributes from which the analytic flow within the database is designed; and
   receiving the analytic flow by the database management system, the analytic flow operating within the database management system on data stored in the physical target data source that has been retrieved using the table object and transformed using the transformation object.

14. The computer program product of claim 13 wherein the physical target data source comprises one of a relational database, and one or more data files.

15. The computer program product of claim 14 wherein of the data source connection object comprise a name of the data source connection object, and a storage for metadata of the physical target data source.

16. The computer program product of claim 15 wherein the table object further stores one or more attribute names and attribute types for the data source connection object.

17. The computer program product of claim 16 wherein the transformation object stores one or more attributes for the template data source and one or more attributes for the physical target data source, and a mapping relationship between data in the physical target data source and corresponding data in the template data source.

18. The computer program product of claim 15 further comprising providing a graphical user interface for designing and defining the analytic flow, the graphical user interface providing icons representing nodes in the analytic flow, wherein each node encapsulates a pointer to a physical location in which the data is stored in the data store, and an operator for transformation or algorithmic processing of the data.

* * * * *